United States Patent [19]
Michetti

[11] Patent Number: 4,843,463
[45] Date of Patent: Jun. 27, 1989

[54] LAND VEHICLE MOUNTED AUDIO-VISUAL TRIP RECORDER

[76] Inventor: Joseph A. Michetti, 1646 Swift Ave., Ventura, Calif. 93003

[21] Appl. No.: 197,673

[22] Filed: May 23, 1988

[51] Int. Cl.⁴ .............................................. H04N 7/18
[52] U.S. Cl. ........................................ 358/108; 360/5
[58] Field of Search ....................... 358/108, 93, 229; 346/107 VP; 354/293; 360/5

[56] References Cited

U.S. PATENT DOCUMENTS

| | | | |
|---|---|---|---|
| 2,148,119 | 2/1939 | Grist | 346/107 VP |
| 3,176,602 | 4/1965 | Wilt | 354/293 |
| 4,001,881 | 1/1977 | Folsom | 360/5 |
| 4,093,364 | 6/1978 | Miller | 354/293 |
| 4,281,354 | 7/1981 | Conte | 358/105 |
| 4,396,942 | 8/1983 | Gates | 358/107 |
| 4,420,238 | 12/1983 | Felix | 358/229 |
| 4,533,962 | 8/1985 | Decker | 360/5 |
| 4,568,972 | 2/1986 | Arents | 358/108 |
| 4,578,665 | 3/1986 | Yang | 358/108 |

FOREIGN PATENT DOCUMENTS 2376415 9/1978 France ................................. 360/5

*Primary Examiner*—Howard W. Britton

[57] ABSTRACT

An easy to use audio-visual video tape recording system mounted in or on a land vehicle. The system is automatically activated when the ignition is turned 'ON' to record events forward and rearward simultaneously. In addition the following are recorded simultaneously as they occur: left turn signal, right turn signal, velocity in miles or kilometers per hour, brakes applied, safety belt fastened, date, time (24 hour clock), and vehicle identification. All the previously mentioned events would be shown on a television screen during a replay of the video tape. Certain modes of recordation would not apply to a mounting on a water-borne vehicle. This invention will be of great value toward settling insurance claims, contesting the issuance of unfair/unfounded traffic citations ... etc. It will be an important tool for delivery companies in that they can show where the delivery vehicle was at any time. In the case of traffic fatalities it will be of importance to those who must investigate and report their findings. Those findings will surely result in safer and safer vehicles and highways, and less and less reckless drivers on the road.

7 Claims, 2 Drawing Sheets

LAND VEHICLE MOUNTED AUDIO-VISUAL TRIP RECORDER

BACKGROUND

1. Field of Invention

This invention relates to closed circuit audio-visual video tape systems, for use in or on a land vehicle for recording events as they occur, forward and rearward.

2. Prior Art

Almost every driver of a land vehicle has, at one time or another, been exposed to an event where an unimpeachable record of that event would be of great value to him or her.

Heretofore there is no assembly or device known which can provide this record.

There are several conventional type motion picture cameras which photograph forward events as they occur.

U.S. Pat. No. 2,148,119 shows a camera mounted on the sun visor inside a car to photograph a speedometer mounted on the outside of the car and at the same time photograph the car it is following.

U.S. Pat. No. 3,176,602 has a camera mounted on the dashboard of a car for photographing events occuring in front of the vehicle.

U.S. Pat. No. 4,093,364 is a camera hidden in a cutout in the dashboard of a police car for use at particular times at the discretion of the driver for photographing the speedometer inside the car and the car being followed.

OBJECTS AND ADVANTAGES

Accordingly the following are objects and advantages of the invention:

to provide an easy to use audio-visual video tape assembly for recording events forward and rearward of a land vehicle.

In addition the following are additional objects and advantages: to simultaneously record on the same video tape the following events and activities of the driver:
- A. Left turn signal activated
- B. Right turn signal activated
- C. Drivers safety belt engaged
- D. Velocity in miles per hour or kilometers per hour
- E. Vehicle stopped or at rest
- F. Brakes applied
- G. Date, time (24 hour clock), vehicle identification to be displayed on the lower portion of the replay screen.

The fully recorded video tape can be re-used by merely activating a 'REWIND' button. Or it can be extracted and replaced by a fresh video tape. The invention is automatically turned on with the closing of the ignition switch from which it draws its energy. The vehicle identification consists of recording into the memory of the central recording unit the license plate number and state, to be displayed on replay of the videotape. The vehicle identification number can not be changed unless the central recording unit has no video tape in place.

Readers will find further objects, advantages, and features of the invention from a consideration of the ensuing description and the accompanying drawings.

DRAWING FIGURES

Figure 1:
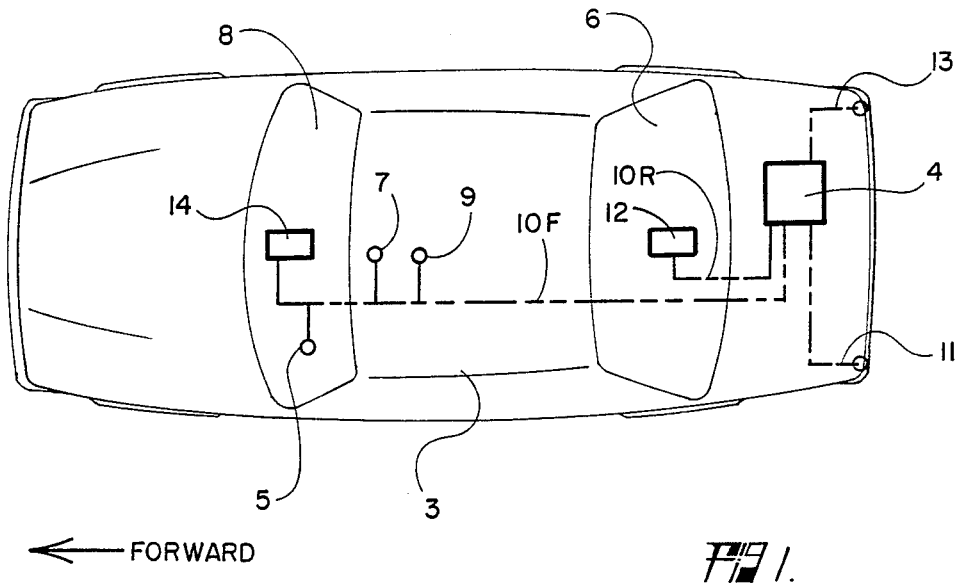
FIG. 1 shows a plan view of a land vehicle with the assembly installed and ready to operate.

DRAWING REFERENCE NUMERALS 3 land vehicle
4 central recording unit
5 ignition switch
6 rear windshield
7 speedometer sensor
8 front windshield
9 safety belt sensor
10F forward signal transmission cable
10R rearward signal transmission cable
11 left turn signal, stop light wire, tap
12 rearward camera
13 right turn signal, stop light wire, tap
14 forward camera
16 forward replay view
18 imaginary division line
20 rearward replay view
22 left turn signal indicator light spot
24 safety belt fastened light spot
26 digital time and date display
28 vehicle identification number digital display
30 velocity in miles or kilometers per hour digital display
32 brakes applied light spot
36 right turn signal indicator light spot
38 television screen

ASSEMBLY DESCRIPTION

FIG. 1 shows the assembly installed in a land vehicle according to a preferred embodiment of the invention. The assembly consists of a forward viewing camera 14 a forward signal transmission cable 10F a speedometer sensor 7 an ignition switch 5 a safety belt fastened sensor 9 a rearward viewing camera 12 a rearward signal transmission cable 10R a central recording unit 4 a left turn signal, stop light wire, tap 11 a right turn signal, stop light wire, tap 13.

Figure 2:
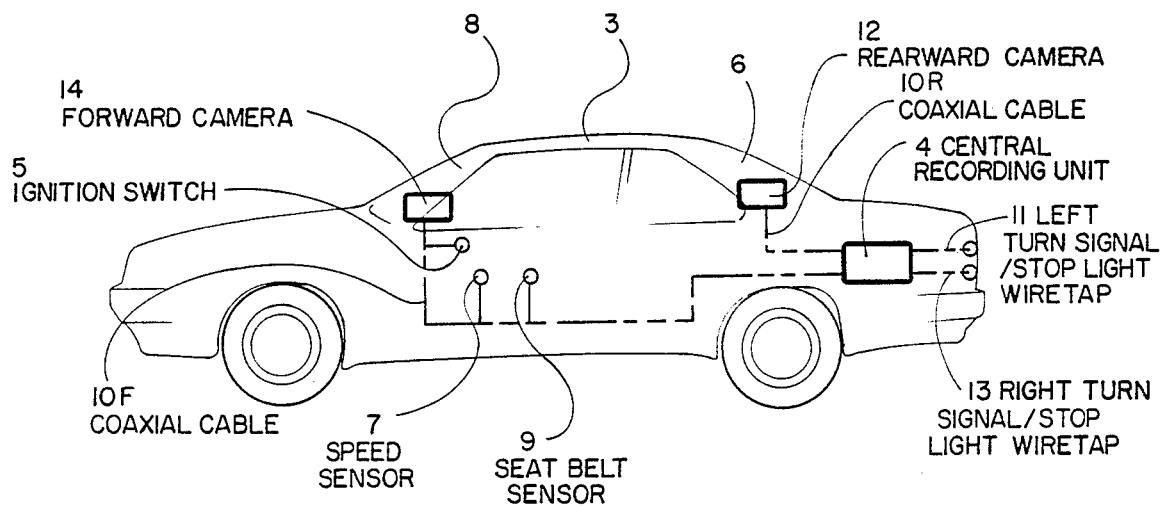
FIG. 2 shows a side view of a land vehicle with the assembly installed and ready to operate.
Figure 3:
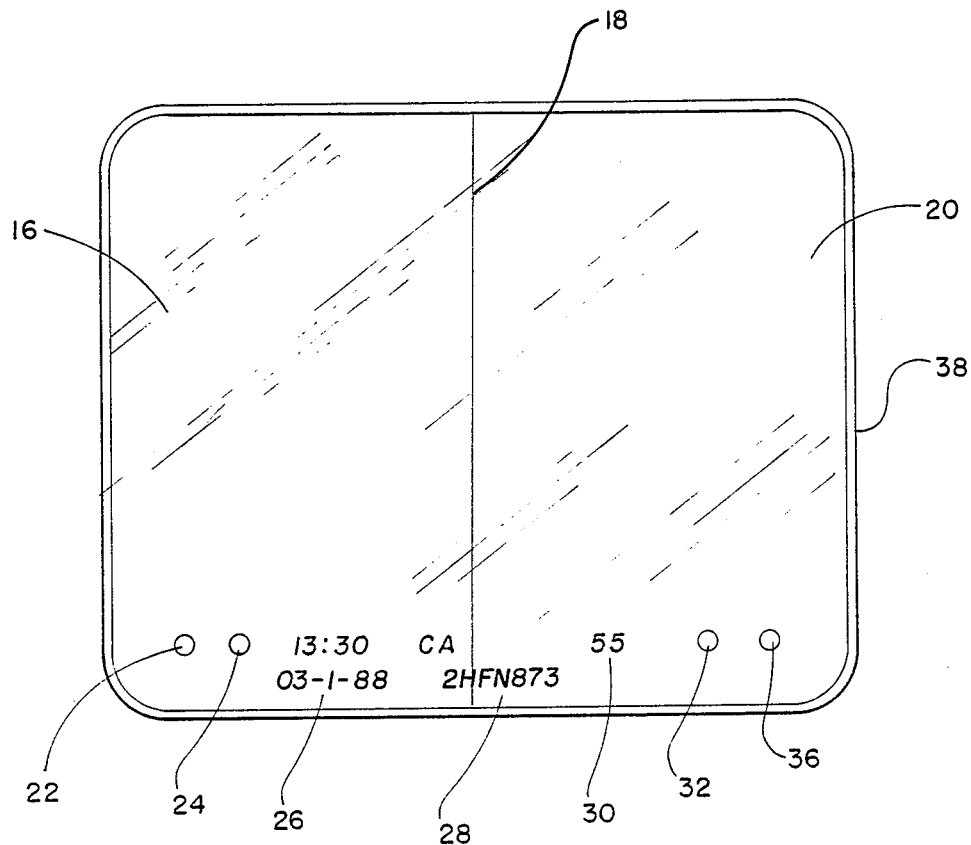
FIG. 3 shows an imaginary television screen during a replay of the various occurrences and activities taking place as they were recorded.

FIG. 2 shows a side view of the same assembly installed in a land vehicle according to a preferred embodiment of the invention.

ASSEMBLY OPERATION

The ease of operation of this assembly is as simple as turning on the ignition 5 thereby activating all systems and modes in the assembly. Of course as previously described the date and time modes 26 are always on and do not depend on the ignition 5 the same is true for the vehicle identification number 28 which is also on all the time, having been previously recorded in the memory of the central recording unit 4.

Rewinding the video tape for re-use is accomplished by activating the rewind mode on the central recording unit 4, to keep the recorded video tape for future replay it is extracted from the central recording unit 4 and replaced with afresh video tape. The central recording unit 4 will be lockable as an option.

Occurrences during an imaginary trip would be as follows: the operator turns on the ignition switch 5 thereby energizing the forward camera 14 and the central recording unit 4 through the forward signal transmission cable 10F and the rearward camera through rearward signal transmission cable 10R both cameras are now recording all audio and visual events within their scope of the reception. The operator fastens the drivers safety belt thereby activating the safety belt fastened sensor 9 and transmitting the signal through the forward signal transmission cable 10F to the central recording unit 4 the operator now steps on the brake pedal activating the left turn signal stop light wire tap 11 and the right turn signal stop light wire tap 13 and sending the signal to the central recording unit 4 records the same for as long as the brake pedal is engaged. The operator begins to drive forward activating the speedometer sensor 7 and transmitting the speed in miles or kilometers per hour to the central recording unit 4 through the forward signal transmission cable 10F. The operator now signals a left turn thereby activating the left turn signal stop light wire tap 11 and transmitting that signal to the central recording unit 4 through said wiretap 11. The operator now signals a right turn thereby activtating the right turn signal stop light wire tap 13 and transmitting that signal to the central recording unit 4 through said wiretap 13.

Upon extracting the video tape from central recording unit 4 and replaying it on a television screen 38 the viewer will see the following: as the videotape begins its replay of the imaginary trip the first thing seen is a forward and rearward view of the outside of the land vehicle 3 through the front windshield 8 and the rear windshield 6, across the lower portion of the screen will be seen in digital display, the time and date 26, and vehicle idenifications number 28, also shown will be the velocity in miles or kilometers per hour digital display 30 reading zero. Simultaneously all record sound will be heard through the entire replay. The next occurrence will be seen as a spot of light on the screen showing that the operator has fastened the safety belt 24 this light spot will remain visible as long as the belt is on. The next occurrence is a steady spot of light indicating that the brakes are applied 32 and remains visible as long as the brakes are applied. The next occurrence is the brakes applied light 32 goes out and the velocity in miles per hour digital display 30 reveals that the vehicle is moving forward at an increasing rate of speed and leveling off at 20 miles per hour, next is a spot of light flashing intermittently indicating that the vehicle is about to make a left turn 22 which ceases flashing when the turn is completed. The next occurrence is a spot of light flashing indicating that the vehicle is about to make a right turn 36 the light spot ceases flashing when the turn is completed. The next occurrence is the light spot showing the brakes applied 32 as we see the miles per hour digital display 30 decreasing to zero. At this point the screen becomes void indicating that the operator has turned off the ignition switch 5.

While the above description contains many specifities, the reader should not construe these as limitations on the scope of the invention, but merely as exemplifications of preferred embodiments thereof. Those skilled in the art will envision many other possible variations are within its scope. For example skilled artisans will readily be able to change the dimensions and shapes of the various embodiments. They will also be able to envision alternative types of construction and installations. They can increase the different modes of information possible through the replay of the video tape, for instance an inset on the screen of the driver's face to reveal sleepiness, confusion, inattentiveness . . . etc. They will envision, I'm sure, a left viewing camera and a right viewing camera. Accordingly the reader is requested to determine the scope of the invention by the appended claims and their legal equivalents, and not by the examples which have been given.

I claim:

1. An audio-video system having multiple cameras to provide signals representing scenes inside and outside of a land vehicle to be recorded simultaneously on one video tape each sharing a portion of the screen on replay the simultaneous recording being accomplished by a central recording unit located within the vehicle.

2. The system of claim 1 further including means for showing a constant display of the vehicle's license plate number or other identification number.

3. The system of claim 1 further including means for showing a turn signal on replay as activated or deactivated.

4. The system of claim 1 further including means for showing an indication whether the seat belt is fastened.

5. The system of claim 1 further including means for showing an indication whether the brakes are applied.

6. The system of claim 1 further including means for showing an indication of vehicle velocity.

7. The system of claim 1 further including means for showing an indication of time and date.

* * * * *